United States Patent
Izzo

(10) Patent No.: US 10,317,928 B2
(45) Date of Patent: Jun. 11, 2019

(54) HAPTIC DEVICE FOR VIBRATING A CONTROL STICK

(71) Applicant: AIRBUS HELICOPTERS, Marignane (FR)

(72) Inventor: Pascal Izzo, Berre l'Etang (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 15/497,457

(22) Filed: Apr. 26, 2017

(65) Prior Publication Data
US 2017/0308113 A1    Oct. 26, 2017

(30) Foreign Application Priority Data
Apr. 26, 2016   (FR) ..................... 16 00689

(51) Int. Cl.
| | |
|---|---|
| G05G 5/03 | (2008.04) |
| B06B 1/02 | (2006.01) |
| B06B 1/06 | (2006.01) |
| B64C 13/12 | (2006.01) |
| G05G 5/05 | (2006.01) |
| G05G 9/047 | (2006.01) |
| B64C 13/10 | (2006.01) |

(52) U.S. Cl.
CPC ............ *G05G 5/03* (2013.01); *B06B 1/0207* (2013.01); *B06B 1/0648* (2013.01); *B64C 13/10* (2013.01); *B64C 13/12* (2013.01); *G05G 5/05* (2013.01); *G05G 9/047* (2013.01); *G05G 2009/04766* (2013.01); *G05G 2009/04774* (2013.01)

(58) Field of Classification Search
CPC ............ G05G 5/03; G05G 5/05; G05G 9/047; G05G 2009/04766; G05G 2009/04774; B64C 13/12; B64C 13/10; B06B 1/0207; B06B 1/0648
See application file for complete search history.

(56) References Cited

U.S. PATENT DOCUMENTS

| | | | |
|---|---|---|---|
| 2,566,409 A | 9/1951 | Greene | |
| 5,986,582 A | 11/1999 | Greene et al. | |
| 6,002,349 A | 12/1999 | Greene et al. | |
| 7,112,107 B1 * | 9/2006 | Torgerud | ............. B63H 21/213 440/2 |
| 7,126,496 B2 | 10/2006 | Greene | |

(Continued)

FOREIGN PATENT DOCUMENTS

FR      2875787      3/2006

OTHER PUBLICATIONS

French Search Report for French Application No. FR 1600689, Completed by the French Patent Office dated Dec. 20, 2016, 7 Pages.

*Primary Examiner* — Victor L MacArthur
(74) *Attorney, Agent, or Firm* — Brooks Kushman P.C.

(57) ABSTRACT

A haptic device comprising a base and at least one shaker branch. Said at least one branch is connected to the base by mobility means conferring a degree of freedom on the branch to move in rotation about a pivot axis relative to the base. An exciter member comprises electrical exciter means configured to cause said at least one branch to shake by moving in rotation about the pivot axis from a rest position to an activated position, and resilient return means tending to maintain each branch in the corresponding rest position.

19 Claims, 2 Drawing Sheets

(56) References Cited

U.S. PATENT DOCUMENTS

| | | | | |
|---|---|---|---|---|
| 7,474,296 B2* | 1/2009 | Obermeyer | ............ | G05G 9/047 |
| | | | | 345/156 |
| 8,094,121 B2* | 1/2012 | Obermeyer | ............ | G05G 9/047 |
| | | | | 345/156 |
| 8,502,433 B2* | 8/2013 | Zanella | ................ | B23K 11/28 |
| | | | | 310/328 |
| 8,803,802 B2* | 8/2014 | Hatanaka | ................ | G05G 5/05 |
| | | | | 345/161 |
| 8,816,962 B2* | 8/2014 | Obermeyer | ............ | G05G 9/047 |
| | | | | 345/156 |
| 2004/0233159 A1* | 11/2004 | Badarneh | ................ | G06F 3/016 |
| | | | | 345/156 |
| 2005/0162389 A1* | 7/2005 | Obermeyer | ............ | G05G 9/047 |
| | | | | 345/161 |
| 2005/0268744 A1* | 12/2005 | Embach | .................. | B62D 1/06 |
| | | | | 74/551.9 |
| 2012/0162076 A1* | 6/2012 | Obermeyer | ............ | G05G 9/047 |
| | | | | 345/161 |
| 2013/0265233 A1* | 10/2013 | Obermeyer | ............ | G05G 9/047 |
| | | | | 345/161 |
| 2015/0153842 A1* | 6/2015 | Obermeyer | ............ | G05G 9/047 |
| | | | | 345/161 |

* cited by examiner

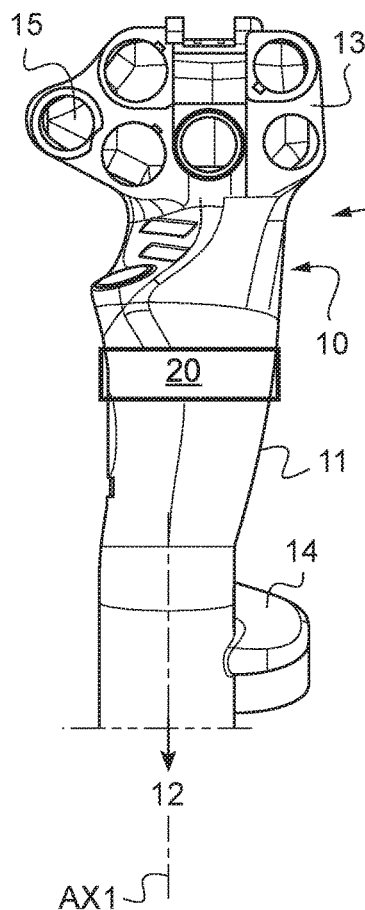
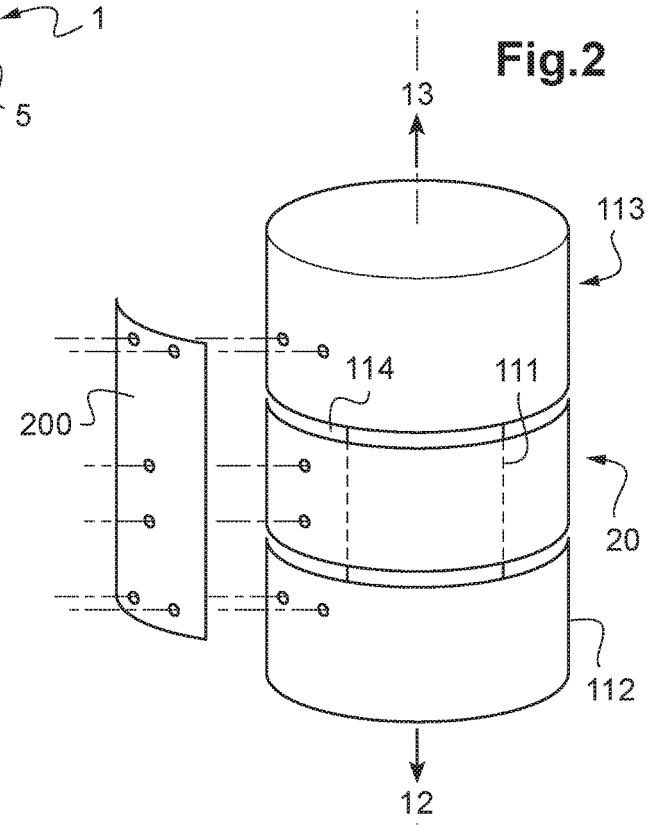
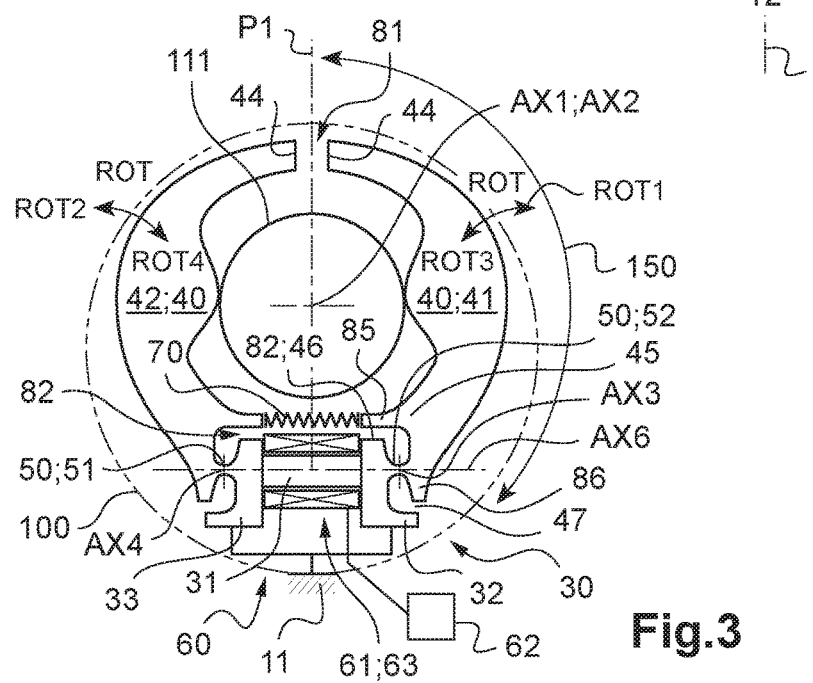

HAPTIC DEVICE FOR VIBRATING A CONTROL STICK

CROSS-REFERENCE TO RELATED APPLICATIONS

This application claims priority to French patent application No. FR 16 00689 filed on Apr. 26, 2016, the disclosure of which is incorporated in its entirety by reference herein.

BACKGROUND OF THE INVENTION

(1) Field of the Invention

The present invention relates to a haptic device for vibrating a control stick, to an assembly comprising the control stick and the haptic device, and to an aircraft.

The invention thus lies in the technical field of haptic systems for aircraft.

(2) Description of Related Art

An aircraft usually includes pilot-operable control sticks. The term "control stick" is used to designate a member that a pilot can move manually in order to control an airfoil surface of the aircraft.

For example, a helicopter has a main rotor contributing at least in part to providing the helicopter with lift. A control stick referred to as the "cyclic stick" serves to vary the pitch of the blades of the main rotor cyclically. A control stick referred to as the "collective pitch lever" enables the pitch of the blades of the main rotor to be varied collectively.

A control stick may include a haptic device arranged in a handle. Such a haptic device enables a pilot to feel a sensation in a hand in order to inform the pilot about an event. A haptic device may be used in particular to inform a pilot that the aircraft is being piloted while using some particular piloting relationship.

It is difficult to integrate a haptic device on or in a control stick of a rotary wing aircraft. Specifically, such a control stick may include means that can be operated by a pilot and that make it difficult to integrate a haptic device. Such pilot-operable means are sometimes referred to as "switches" and may comprise various types of button. On a rotorcraft, a control stick includes a number of switches that is sometimes more considerable than on an airplane.

Such a haptic device may possess a vibrator member. Such a vibrator member serves to cause the control stick to vibrate so as to transmit information to a pilot. Depending on where the vibrator member is located, the pilot does not perceive the same sensations when the vibrator member is activated.

A vibrator member may be arranged in a handle of the control stick, or at a hinge of the control stick. For example, a control stick may be hinged to a universal joint assembly having a vibrator member.

Integrating the vibrator member in the handle is advantageous. Nevertheless, the handle then possesses dimensions that are relatively great in order to be able to receive the vibrator member.

In addition, the vibrator member may constitute an obstacle within the control stick for passing electric wires connected to switches carried by the handle.

Integrating the vibrator member in a universal joint assembly may possibly avoid this drawback. Nevertheless, the pilot runs the risk of not being able to feel easily the vibration generated by the vibrator member as a result of where it is located.

Document U.S. Pat. No. 2,566,409 presents a control stick having a tube carrying a handle.

A vibrator device is fastened to the tube. The vibrator device comprises a sleeve slidably mounted all around the tube. The sleeve carries annular ball bearing means cooperating with a toothed ring. The toothed ring carries an eccentric circularly arcuate mass.

The toothed ring meshes with a gearwheel mounted on the outlet shaft of an electric motor. The electric motor can thus cause the toothed ring and the eccentric mass to rotate about the tube.

Document U.S. Pat. No. 5,986,582 proposes a first vibrator device mounted on the top of a collective pitch lever type control stick. The first vibrator device comprises an electric coil arranged in a housing. The electric coil has a rod passing therethrough and extending longitudinally outside the housing between two abutments. In addition, a spring extends longitudinally between a shoulder of the rod and the housing. The electric coil is controlled to cause the rod to move in translation from one abutment to the other abutment.

Document U.S. Pat. No. 5,986,582 proposes a second vibrator device. That second device comprises an eccentric mass caused to rotate about an axis.

Documents FR 2 875 787 and U.S. Pat. No. 6,002,349 are also known.

BRIEF SUMMARY OF THE INVENTION

An object of the present invention is thus to propose a novel haptic device.

The present invention thus provides a haptic device for vibrating a segment of a control stick on command, in particular a control stick of an aircraft.

The haptic device comprises:

a base;

a mass assembly comprising at least one shaker branch, referred to for short as a "branch", said at least one branch extending circumferentially over at least 45 degrees around a central axis, the central axis being configured in a mounted position to coincide with a middle axis along which the segment extends, each branch being connected to the base by respective mobility means conferring a degree of freedom on the branch to move in rotation about a pivot axis relative to the base, the pivot axis being distinct from the central axis;

an exciter member comprising electrical exciter means configured to cause the at least one branch to shake by moving in rotation about said pivot axis from a rest position to an activated position; and resilient return means tending to maintain each branch in the corresponding rest position.

The term "mounted position" refers to the position in which the mass assembly is to be found when the haptic device is fastened to the segment of the control stick.

The term "middle axis" designates the axis along which the control stick extends in elevation from its bottom end to its top end, and thus in particular the axis along which the segment in question extends in elevation. This middle axis can be arranged substantially along the gravity direction.

The term "electrical exciter means" designates a member that is electrically powered in order to drive movement of each branch relative to the base and to the segment of the control stick. The electrical exciter means include an input interface receiving an order coming from a conventional processor unit for causing each branch to shake. Such a processor such as a calculator unit may for example require each branch to be excited during certain stages of flight as defined by the manufacturer.

Under such circumstances, the haptic device includes fastener means for fastening the haptic device on and around a segment of a control stick. For example, the base may be fastened to the segment of the control stick that is to be vibrated. Each branch extends over an angular section of at least 45 degrees around the segment in a plane orthogonal to the middle axis of the segment. Optionally, the haptic device is arranged in a groove formed in an outside surface of the segment of the control stick.

Thus, the haptic device is not arranged inside the control stick, which can thus avoid interfering with the passage of electric wires within the control stick.

Furthermore, the haptic device need not necessarily be fastened at a universal joint assembly. The segment fitted with the haptic device may be a segment that is to be held by the pilot.

Furthermore, the base may be secured to the segment of the control stick. However, each branch is movable relative to the base in order to vibrate the segment when ordered to do so by the processor unit. The movement of the branches may give rise to vibration of the control stick by causing the outside surface of the control stick to come into contact with each of the branches at a characteristic frequency, and/or by the inertial effect. For example, each branch may come into contact against a central cylinder of the segment of the control stick when the branch is in its rest position or in its activated position.

Thus, the operation of the haptic device relies on causing one or more movable branches arranged peripherally around the segment to vibrate. Vibration is transmitted from the branches through the structure of the control stick either by the inertial effect or by coming into contact with the control stick.

For this purpose, the haptic device includes electrical exciter means causing each branch to move and resilient means returning each branch towards a rest position. In succession, the exciter means are operated at a certain frequency to move each branch away from its rest position, and then the resilient means return each branch to its rest position as soon as the exciter means cease to exert a force on each branch.

Such resilient means may comprise a spring, a member comprising a block of rubber or rubber-like material, or indeed a spring blade, for example.

The exciter means may be operated to cause the control stick to vibrate in quasi-static conditions, or in a mode that resonates with a resonant mode of vibration of the control stick in order to amplify the vibration that is produced. In this resonant mode, the excitation frequency of each branch is constant and determined by the dimensions and the characteristics of the haptic device constituting a mass-spring system.

The haptic device may also include one or more of the following characteristics.

Thus, the mobility means may comprise a pivot.

Such a pivot may comprise a hinge presenting only one degree of freedom to move in rotation.

The mobility means may also be in the form of a deformable joint.

Optionally, the mobility means may comprise a spring blade.

The spring blade is stressed solely within its range of elastic deformation so that it tends to return to its rest position.

The spring blade may be an integral portion of one of the branches, and/or of a member of the base.

In another aspect, the resilient means and the mobility means of a branch may coincide.

For example, a flexible blade enables a branch to pivot and tends to return the branch to its rest position.

In another aspect, the base may include a rod and two plates, the rod extending along a transverse axis transversely from one plate to the other plate, each branch being connected by respective mobility means to a respective plate.

For example, the rod extends parallel to an axis that is tangential to a circle in which the haptic device is inscribed. This rod may optionally serve as a support for the exciter means and/or as a support for fastener means and/or indeed as a connection between two mobility means.

In another aspect, the mass assembly may comprise a single branch extending around the central axis over at least 270 degrees.

The haptic device then presents a configuration that is asymmetrical by using only one branch that pivots about a stationary pivot axis. The vibration produced by the rocking movement of the branch can then be transmitted to the body of the control stick by the inertial effect. Contact between a branch and the surface of the control stick is not essential.

Optionally, the resilient means extend between the single branch and a plate of the base.

Alternatively, the at least one branch of the mass assembly may comprise two branches, each branch extending from a root linked to the base to a free end, with an airgap lying transversely between the free ends of the two branches, said exciter means causing the two branches to move in two opposite directions.

The haptic device may then include two branches, optionally of semicylindrical shape and/or forming a symmetrical structure of the type comprising a mass and a countermass. The two branches pivot in opposite directions, possibly anti-phase.

The two branches can cause the control stick to vibrate by coming into contact with the control stick. The body of the control stick is then subjected to a small amount of deformation at the excitation frequency of the branches.

For example, the resilient means may extend between the two branches. Likewise, a rod of the base may extend between the two mobility means of the two branches respectively.

In another aspect, said at least one branch may present at least one abutment member configured to limit the shaking of a branch in one direction by shape interference with the base.

In another aspect, said at least one branch extends from a root connected to the base by respective mobility means towards a free end, the root including at least one of the following abutment members:

a transverse abutment member projecting from the root extending parallel to a transverse direction, a longitudinal gap lying between the transverse abutment member and the base, at least in the rest position or in the activated position; and a longitudinal abutment member projecting from the root extending perpendicularly to the transverse direction, a transverse gap lying between the longitudinal abutment member and the base at least in the rest position or in the activated position.

The transverse direction may be parallel to a tangent to a circle in which the haptic device is inscribed.

In another aspect, the exciter means may comprise an electric coil.

The exciter means may excite each branch electromagnetically. Each branch, or indeed the base, may be made out of magnetic material, such as a metal material.

The electric coil then biases the magnetic circuit as a whole constituted by each of the branches of the vibrator haptic device in order to tend to close an airgap. Where appropriate, such an airgap may lie between two branches or indeed between a branch and the base.

In order to optimize the behavior of the magnetic circuit, in particular with respect to the electric coil, the electric coil may tend to close simultaneously a main airgap between the two free ends of two branches and also secondary airgaps, each arranged between one of the branches and the base in the vicinity of the mobility means of the branch.

Optionally, actuation may also be provided by means of a magnetic circuit that is located in the vicinity of the electric coil, with only the secondary airgap being closed.

Where appropriate, the electric coil may be arranged around a rod of the base.

The exciter means may comprise a piezoelectric bar connected to at least one branch.

The exciter means may move each branch by means of a piezoelectric element arranged between the two branches or between one branch and the base, for example.

The piezoelectric bar operates in "piston" mode when powered electrically, e.g. to make it expand. Thus, the piezoelectric bar is prestressed in compression by the resilient means in the absence of being electrically powered, and it extends while compressing the resilient means when it is electrically powered.

The piezoelectric bar may be offset radially relative to each of the axes of rotation of the mobility means in order to maximize the lever arm between the piezoelectric bar and each branch.

The piezoelectric bar may be powered by low voltage electricity. Under such circumstances, the piezoelectric bar may be of the multilayer PZT ceramic type, for example.

The invention also provides a control assembly comprising a control stick and a haptic device of the type described above. The haptic device is fastened to a segment of the control stick, each branch extending circumferentially around the segment.

The base may be stationary relative to the segment in the mounted position.

The invention also provides an aircraft provided with such a control assembly.

BRIEF DESCRIPTION OF THE DRAWINGS

The invention and its advantages appear in greater detail from the context of the following description of examples given by way of illustration and with reference to the accompanying figures, in which:

FIG. 1 is a view showing an aircraft control assembly of the invention comprising a control stick and a haptic device;

FIG. 2 is a diagrammatic view explaining means for fastening a haptic device to a control stick;

FIG. 3 shows a two-branch haptic device provided with exciter means comprising an electric coil;

Figure 4:
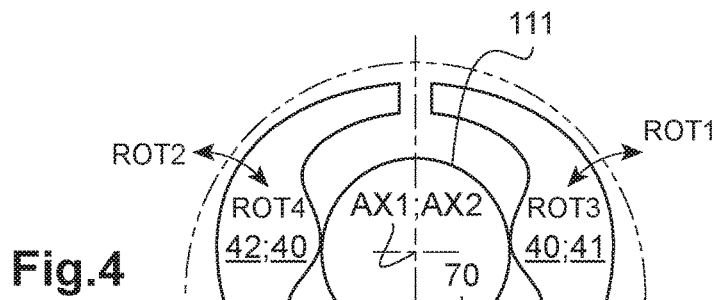
FIG. 4 shows a two-branch haptic device provided with exciter means comprising a piezoelectric bar.

Elements present in more than one of the figures are given the same references throughout.

DETAILED DESCRIPTION OF THE INVENTION

FIG. 1 shows a control assembly 5, for example a control assembly arranged on board an aircraft 1.

The control assembly 5 is provided with a control stick 10 and a haptic device 20.

The control stick 10 extends in elevation along an axis referred to as the "middle axis AX1". This control stick 10 has a central portion extending in elevation between a hinge 12 and an end portion 13 carrying various pilot-operable control means 15. These control means 15 are connected to wires that run inside the segment 11.

In addition, the central portion may include a shoulder 14 on which a pilot can rest a side of the palm of one hand, conventionally the side of the palm extending from the little finger. The pilot can then manipulate the control means 15 with the thumb or the index finger, for example.

The haptic device 20 is then fastened to a segment 11 of the control stick.

For example, the segment 11 constitutes the central portion. The haptic device then surrounds the central portion, at least in part.

With reference to FIG. 2, the segment 11 of the control stick fitted with the haptic device may include first and second sections 112 and 113 that are separated by an intermediate section 111. The intermediate section 111 may be of dimensions that are smaller than the dimensions of the first and second sections 112 and 113 so as to leave an annular groove 114. To illustrate this aspect, the sections may be in the form of right circular cylinders centered on the middle axis AX1, with the intermediate section 111 presenting a diameter that is smaller than the diameters of the first and second sections 112 and 113.

Under such circumstances, the haptic device 20 can be received in the annular groove 114, surrounding the intermediate section 111 of the segment. By way of example, a plate 200 may fasten the haptic device 20 to the first section 112 and/or to the second section 113. The haptic device may be hidden in covers for reasons of appearance.

Independently of this aspect, FIGS. 3 to 6 show a haptic device 20 in various embodiments of the invention.

With reference to FIG. 3, and regardless of the embodiment, the haptic device 20 includes a base 30 carrying a vibrating mass assembly.

This mass assembly is provided with at least one branch 40.

Each branch 40 extends circumferentially in a plane orthogonal to a central axis AX2 and covers a circular arc 150. This circular arc 150 extends over not less than 45 degrees.

In a mounted position, the central axis AX2 coincides with the middle axis AX1. Under such circumstances, each branch extends around the segment 11 of the control stick fitted with the haptic device. For example, each branch 40 extends in a groove of the segment around an intermediate section 111 of the segment.

In particular, each branch 40 extends circumferentially from a root 45 towards a free end 44. The root 45 is then hinged to the base via mobility means 50.

The mobility means 50 of a branch 40 allows the branch 40 a degree of freedom to move in rotation ROT relative to the base 30 about a pivot axis AX3, AX4. This pivot axis is offset relative to the central axis AX2, or indeed to a plane of symmetry P1 of the haptic device. In addition, this pivot axis is situated outside the segment 11 of the control stick that is surrounded by the corresponding branch.

For example, the mobility means 50 may comprise a pivot 51 or a flexible blade 52. These two types of mobility means are shown in FIG. 3.

In addition, the haptic device 20 possesses an exciter member 60 for moving each of the branches 40 from a rest position towards an activated position as shown in FIG. 3.

The term "rest position" is used to mean the position occupied by the branch in the absence of any force exerted by the exciter member 60.

Conversely, the term "activated position" designates the position occupied by the branch in the presence of a force exerted by the exciter member 60.

The exciter member 60 comprises electrical exciter means 61 generating a force suitable for driving pivoting of a branch about the corresponding pivot axis. By way of example, the exciter means may comprise a magnetic coil 63 as shown in FIG. 3 or a piezoelectric bar as described below.

Furthermore, the exciter member may include a processor unit 62 for generating an excite order that is transmitted to the exciter means in order to require each branch to move. By way of example, the processor unit may comprise a processor, an integrated circuit, a programmable system, a logic circuit, these examples not limiting the scope to be given to the term "processor unit". The processor unit may include various sensors for determining whether a move order is to be transmitted to the exciter means.

For example, an avionics system of the aircraft may order the processor unit to power the exciter means electrically at a predetermined frequency.

Furthermore, the haptic device includes resilient return means 70 connected to each branch in order to return a branch from its activated position to its rest position.

The resilient return means may comprise at least one spring or resilient member.

For example, the resilient return means 70 and the mobility means 50 may together comprise a single member. Specifically, a spring blade connecting the root of a branch to the base may act both as resilient return means and as mobility means.

In another aspect, each branch may be provided with at least one abutment member 85, 86. Such an abutment member 85, 86 is configured to limit shaking movement of the branch in one direction by shape interference with the base 30 either to avoid damaging the control stick or to avoid the branch being torn off.

Thus, a branch may have a transverse abutment member 85. This transverse abutment member 85 projects from the root 45 of the branch extending parallel to a transverse direction AX6. By way of example, this transverse direction is parallel to a tangent of a circle 100 in which the haptic device is inscribed, and possibly represents a transverse axis AX6 along which the base 30 extends. A longitudinal gap 46 lies between the transverse abutment member 85 and the base 30, at least in the rest position or in the activated position in a direction orthogonal to the transverse direction.

Alternatively or in addition, a branch may have a longitudinal abutment member 86. This longitudinal abutment member 86 projects from the root 45 of the branch, extending perpendicularly to the transverse direction AX6. A transverse gap 47 then lies between the longitudinal abutment member 86 and the base 30, at least in the rest position or in the activated position, in a direction parallel to the transverse direction.

Figure 5:
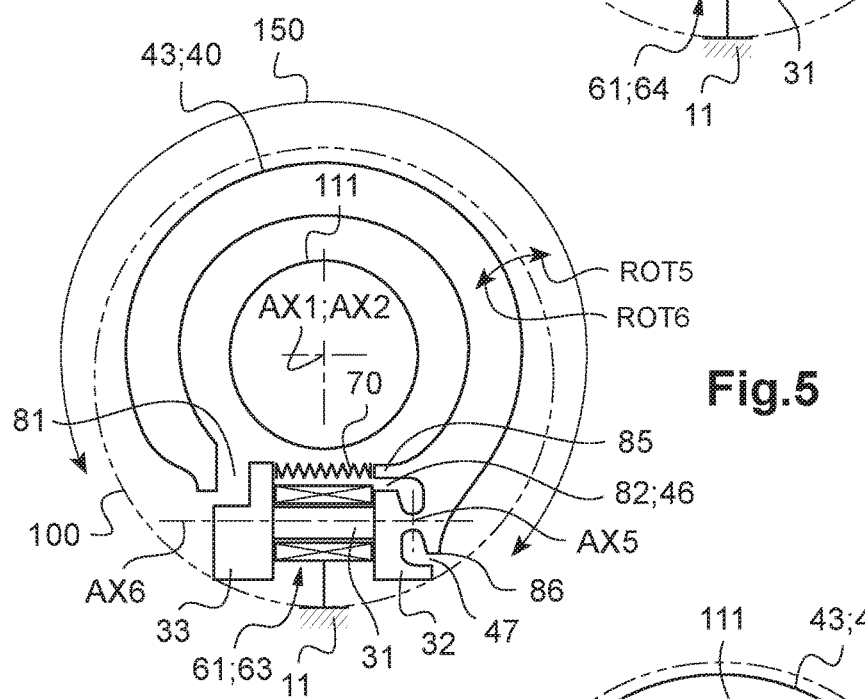
FIG. 5 shows a single-branch haptic device provided with exciter means comprising an electric coil.
Figure 6:
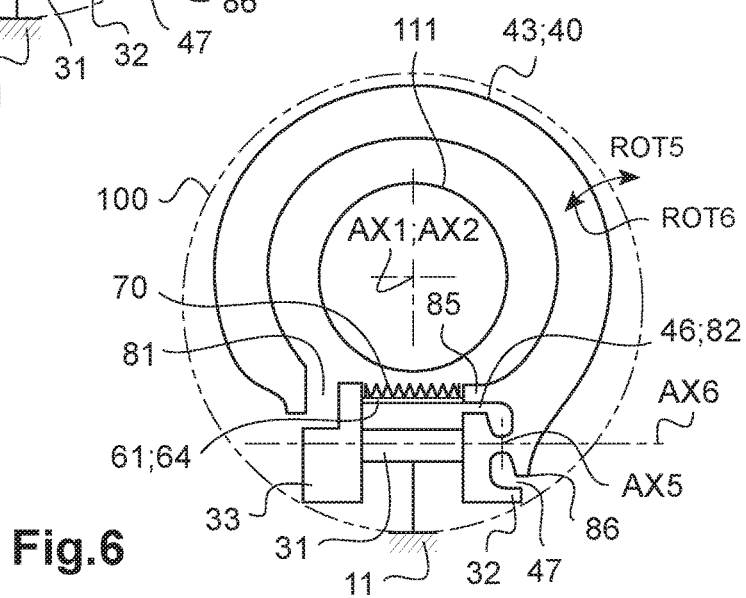
FIG. 6 shows a single-branch haptic device provided with exciter means comprising a piezoelectric bar.

Under such circumstances, FIGS. 3 and 4 show a mass assembly having two branches 41 and 42, while FIGS. 5 and 6 show a mass assembly having a single branch 43.

In a first embodiment, and with reference to FIG. 3, the mass assembly thus comprises a first branch 41 movable in pivoting about a first pivot axis AX3 of first mobility means. Furthermore, the mass assembly includes a second branch 42 movable in pivoting about a second pivot axis AX4 of second mobility means. A top airgap 81 lies transversely between the first free end of the first branch and the second free end of the second branch.

In the activated position, the first branch 41 and the second branch 42 may be in contact with the segment of the control stick that is surrounded by the haptic device. Thus, by way of example, each branch may include a projection bearing against an outside surface of the segment in this rest position.

In the rest and/or activated position, the first branch 41 and the second branch 42 may be situated symmetrically on either side of a plane of symmetry P1 in elevation. The first pivot axis AX3 and the second pivot axis AX4 are arranged symmetrically on either side of this plane of symmetry P1 in elevation.

In addition, the resilient return means 70 may extend from the first branch 41 to the second branch 42. For example, the resilient return means 70 may be fastened firstly to the transverse abutment member 85 of the first branch and secondly to the transverse abutment member 85 of the second branch.

Alternatively, each branch may be connected to the base 30 via its own resilient return means.

In a first variant of the first embodiment shown in FIG. 3, the base may include a rod 31 secured to two plates 32 and 33. The rod 31 extends along a transverse axis AX6 transversely from one plate 32 to the other plate 33. The first branch 41 is then hinged to the first plate and the second branch 42 is hinged to the second plate.

At least one plate and possibly also the rod may then optionally be fastened to the segment 11 by conventional fastener means, such as screw-fastener means, for example.

In addition, the exciter means include an electric coil 63 arranged around the rod 32.

Under such circumstances, and when the electric coil 63 is not powered electrically, the resilient return means 70 tends to move the first branch 41 and the second branch 42 away from each other by causing them to move in rotation in opposite directions ROT1 and ROT2 about their respective axes of rotation AX3 and AX4.

Furthermore, when the electric coil 63 is powered electrically, the coil tends to close the top airgap 81, and indeed the bottom airgap 82 represented by each of the longitudinal gap 46. The first branch 41 and the second branch 42 then tend to move towards each other by moving in rotation in opposite directions ROT3 and ROT4 about their respective axes of rotation AX3 and AX4. The first branch 41 and the second branch 42 then come into contact against the control stick.

In the second variant of the first embodiment as shown in FIG. 4, the base may include a rod 31 that is secured to the mobility means hinged to the first branch 41 and to the mobility means hinged to the second branch 42.

Furthermore, the exciter means include a piezoelectric bar 64 extending between a protuberance of the first branch 41 and a protuberance of the second branch 42.

The rod and/or a stationary zone of the piezoelectric bar 64 may be fastened to the segment 11 of the control stick.

Under such circumstances, and when the piezoelectric bar 64 is not electrically powered, the resilient return means 70 tends to move the first and second branches 41 and 42 towards each other by causing them to move in rotation in opposite directions ROT3 and ROT4 about their respective axes of rotation AX3 and AX4. The first and second branches 41 and 42 then come into contact against the control stick. In addition, the piezoelectric bar 64 is pre-stressed in compression.

In contrast, when the piezoelectric bar 64 is electrically powered, the piezoelectric bar 64 expands. The piezoelectric bar 64 tends to move the first and second branches 41 and 42 apart from each other so that they move in rotation in opposite directions ROT1 and ROT2 about their respective axes of rotation AX3 and AX4.

The first and second branches 41 and 42 strike the segment 11 of the control stick at a certain frequency, causing it to vibrate.

In a second embodiment, and with reference to FIG. 5, the mass assembly thus has only one branch 43 that is movable in rotation about a single pivot axis AX5 of single mobility means. A top airgap 81 separates the free end of the single branch 43 from the base.

Under such circumstances, the circular arc 150 described by the single branch 43 is greater than or equal to at least 270 degrees.

In the activated position and in the rest position, the sole branch 43 need never come into contact with the segment of the control stick surrounded by the haptic device.

Furthermore, the base 30 may have a rod 31 secured to two plates 32 and 33. The rod 31 extends along a transverse axis AX6 transversely from one plate 32 to the other plate 33. The sole branch 43 is then hinged to a first plate.

At least one plate and possibly also the rod may then optionally be fastened to the segment by conventional fastener means, such as screw-fastener means, for example.

In addition, the resilient return means 70 may extend from the sole branch 43 to the base. For example, the resilient return means 70 may be fastened firstly to the transverse abutment member 85 of the sole branch 43 and secondly to the plate 33 that is not secured to the mobility means.

In the first variant of the second embodiment shown in FIG. 5, the exciter means comprise an electric coil 63 arranged around the rod 32.

Under such circumstances, when the electric coil 63 is not electrically powered, the resilient return means 70 tend to move the free end of the sole branch 43 away from the base 30 by causing it to move in rotation ROT5 about its pivot axis AX5.

In contrast, when the electric coil 63 is electrically powered, the electric coil 63 tends to close the top airgap 81, and also a bottom airgap 82 represented by each longitudinal gap 46. The free end of the sole branch 43 tends to move in rotation ROT6 towards the base 30.

In the second variant of the second embodiment shown in FIG. 6, the exciter means comprise a piezoelectric bar 64. The piezoelectric bar 64 extends between a protrusion from the sole branch 43 and the base 30.

In the second variant of the second embodiment shown in FIG. 6, the exciter means comprise a piezoelectric bar 64. The piezoelectric bar 64 extends between a protrusion from the sole branch 43 and the base 30.

In contrast, when the piezoelectric bar 64 is powered electrically, the piezoelectric bar 64 expands. The piezoelectric bar 64 expands to move the free end of the sole branch 43 away from the base 30 by causing it to move in rotation ROT5 about its pivot axis.

Whatever the embodiment, and by way of illustration, the haptic device can be inscribed in a circle 100 presenting a diameter of about 25 millimeters. The haptic device may also extend in elevation over a height of about 20 millimeters, for example. The mass assembly may for example possess a mass of 15 grams.

The top airgap between the two branches or between a single branch and a base may be of millimeter order.

Each branch may vibrate over an amplitude of the order of 0.2 millimeters, being driven at a frequency of the order of 50 hertz (Hz) to 100 Hz.

When using an electric coil, the coil may present a resistance of the order of 25 ohms, with mean self-inductance of 100 millihenries (mH). The current conveyed by the electric coil may be of the order of 0.18 amps and the amplitude of the voltage at 100 Hz may be 12 volts.

When using a piezoelectric bar, the piezoelectric bar may have a length of the order of 20 millimeters and a section of the order of 9 millimeters, for example.

The piezoelectric bar may present capacitance of 4.5 microfarads (µF). The current conveyed by the piezoelectric bar may be of the order of 60 amps and the voltage at 100 Hz may have an amplitude of 20 volts.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A haptic device for vibrating a segment of a control stick on command, wherein the haptic device comprises:
   a base;
   a mass assembly comprising at least one shaker branch that shakes to vibrate the segment of the control stick, the at least one branch includes (i) a root connected to the base and (ii) a free end, the at least one branch extending from the root towards the free end circumferentially over at least 45 degrees around a central axis, the central axis being configured in a mounted position to coincide with a middle axis along which the segment of the control stick extends, the root of each branch being connected to the base by respective mobility means conferring a degree of freedom on the branch to move in rotation about a pivot axis, the pivot axis being distinct from the central axis;
   electrical exciter means configured to generate a force to cause the at least one branch to shake by moving in rotation about the pivot axis from a rest position to an activated position; and
   resilient return means tending to maintain each branch in the corresponding rest position, wherein the resilient return means and the mobility means are separate elements.

2. The haptic device according to claim 1, wherein the mobility means comprise a pivot.

3. The haptic device according to claim 1, wherein the mobility means comprise a spring blade.

4. The haptic device according to claim 1, wherein the at least one branch comprises a single branch extending around the central axis over at least 270 degrees.

5. The haptic device according to claim 4, wherein the resilient return means extend between the single branch and a plate of the base.

6. The haptic device according to claim 1, wherein the at least one branch includes two branches with an airgap lying transversely between the free ends of the two branches, the electrical exciter means causing the two branches to move in two opposite directions.

7. The haptic device according to claim 6, wherein the base includes a rod, a first plate, and a second plate, the rod extending along a transverse axis transversely from the first plate to the second plate, the two branches being respectively connected by the respective mobility means to the first plate and the second plate.

8. The haptic device according to claim 6, wherein the resilient return means extend between the two branches.

9. The haptic device according to claim 1, wherein each branch presents at least one abutment member configured to limit a shaking of the branch in one direction by shape interference with the base.

10. The haptic device according to claim 9, wherein the root includes at least one of the following abutment members:
- a transverse abutment member projecting from the root extending parallel to a transverse direction, a longitudinal gap lying between the transverse abutment member and the base, at least in the rest position or in the activated position; and
- a longitudinal abutment member projecting from the root extending perpendicularly to the transverse direction, a transverse gap lying between the longitudinal abutment member and the base at least in the rest position or in the activated position.

11. The haptic device according to claim 1, wherein the electrical exciter means comprise an electric coil.

12. The haptic device according to claim 11, wherein the electric coil is arranged around a rod of the base.

13. The haptic device according to claim 1, wherein the electrical exciter means comprise a piezoelectric bar connected to the at least one branch.

14. A control assembly comprising a control stick and a haptic device, wherein the haptic device is the device according to claim 1, the haptic device being fastened to the exterior of the segment of the control stick, each branch extending circumferentially around the exterior of the segment of the control stick; and wherein when shaken by the electrical exciter means to move in rotation about the pivot axis from the rest position to the activated position the at least one branch shakes against the exterior of the segment of the control stick to thereby cause the segment of the control stick to vibrate.

15. An aircraft, wherein the aircraft includes the control assembly according to claim 14.

16. The haptic device according to claim 1, wherein the at least one branch is in a plane and when shaken moves in rotation in the plane.

17. The haptic device according to claim 16, wherein the plane is orthogonal to the central axis.

18. A control assembly comprising:
a control stick; and
a haptic device for vibrating a segment of the control stick on command, wherein the haptic device is fastened to an exterior of the segment of the control stick and the haptic device includes:
a base;
a mass assembly including at least one shaker branch that shakes to vibrate the segment of the control stick, the at least one shaker branch includes (i) a root connected to the base and (ii) a free end, the at least one shaker branch extending from the root towards the free end circumferentially around the exterior of the segment of the control stick over at least 45 degrees around a central axis along which the segment of the control stick extends;
mobility means connecting the root of the at least one shaker branch to the base and conferring a degree of freedom on the at least one shaker branch to move in rotation about a pivot axis, the pivot axis being distinct from the central axis;
electrical exciter means configured to generate a force to cause the at least one shaker branch to shake, by moving in rotation about the pivot axis from a rest position to an activated position, against the exterior of the segment of the control stick to thereby cause the segment of the control stick to vibrate; and
resilient return means tending to maintain the at least one shaker branch in a corresponding rest position, wherein the resilient return means and the mobility means are separate elements.

19. A control assembly comprising:
a control stick; and
a haptic device for vibrating a segment of the control stick on command, wherein the haptic device is fastened to an exterior of the segment of the control stick and the haptic device includes:
a base;
a mass assembly including at least one shaker branch that shakes to vibrate the segment of the control stick, the at least one shaker branch includes (i) a root connected to the base and (ii) a free end, the at least one shaker branch extending from the root towards the free end circumferentially around the exterior of the segment of the control stick over at least 45 degrees around a central axis along which the segment of the control stick extends;
a spring connecting the root of the at least one shaker branch to the base and conferring a degree of freedom on the at least one shaker branch to move in rotation about a pivot axis, the pivot axis being distinct from the central axis;
electrical exciter means configured to generate a force to cause the at least one shaker branch to shake, by moving in rotation about the pivot axis from a rest position to an activated position, against the exterior of the segment of the control stick to thereby cause the segment of the control stick to vibrate; and
the spring tending to maintain the at least one shaker branch in a corresponding rest position.

* * * * *